United States Patent
McClendon et al.

(10) Patent No.: US 9,411,422 B1
(45) Date of Patent: Aug. 9, 2016

(54) USER INTERACTION WITH CONTENT MARKERS

(71) Applicant: Audible, Inc., Newark, NJ (US)

(72) Inventors: Phillip Scott McClendon, Santa Clara, CA (US); Ajay Arora, New York, NY (US); Timothy Thomas Gray, Seattle, WA (US); Douglas Vincent O'Dell, III, Montclair, NJ (US)

(73) Assignee: Audible, Inc., Newark, NJ (US)

( * ) Notice: Subject to any disclaimer, the term of this patent is extended or adjusted under 35 U.S.C. 154(b) by 249 days.

(21) Appl. No.: 14/106,318

(22) Filed: Dec. 13, 2013

(51) Int. Cl.
  *G06F 3/0481* (2013.01)
  *G06F 3/01* (2006.01)
(52) U.S. Cl.
  CPC ...................... *G06F 3/016* (2013.01)
(58) Field of Classification Search
  CPC ........................................................ G06F 3/016
  USPC ........................................................ 715/716
  See application file for complete search history.

(56) References Cited

U.S. PATENT DOCUMENTS

| | | | | |
|---|---|---|---|---|
| 6,031,531 A * | 2/2000 | Kimble | ............... | G06F 3/04812 340/4.1 |
| 6,717,600 B2 * | 4/2004 | Dutta | ............... | G06F 3/04842 715/856 |
| 8,316,301 B2 * | 11/2012 | Kim | ............... | G06K 9/00751 382/165 |
| 8,386,935 B2 * | 2/2013 | van Zwol | ............. | G06F 3/04817 715/716 |
| 9,094,738 B2 * | 7/2015 | Kishore | ........... | H04N 21/23439 |
| 9,110,562 B1 * | 8/2015 | Eldawy | ............... | G06F 3/04812 |
| 2002/0186234 A1 * | 12/2002 | Van De Streek | .. | G06F 3/04852 715/719 |
| 2006/0109256 A1 * | 5/2006 | Grant | ....................... | G06F 3/016 345/173 |
| 2006/0271989 A1 | 11/2006 | Glaser | | |
| 2007/0033515 A1 * | 2/2007 | Sull | .................... | G06F 17/30796 715/202 |
| 2007/0061757 A1 | 3/2007 | Kobayashi | | |
| 2008/0064326 A1 * | 3/2008 | Foster | .................... | H04N 5/278 455/3.06 |
| 2008/0140385 A1 * | 6/2008 | Mahajan | ........... | G06F 17/30787 704/9 |
| 2009/0080853 A1 * | 3/2009 | Chen | ................. | G06F 17/30787 386/241 |
| 2010/0050080 A1 * | 2/2010 | Libert | ............... | G06F 17/30047 715/716 |
| 2010/0169347 A1 * | 7/2010 | Dasher | .............. | G06F 17/30817 707/758 |

(Continued)

*Primary Examiner* — Reza Nabi
(74) *Attorney, Agent, or Firm* — Knobbe, Martens, Olson & Bear, LLP

(57) ABSTRACT

Systems and methods are provided for enabling user interaction with content markers of a content item. Content markers can generally correspond to any point of interest in the content item. In one embodiment, a scrub bar is provided enabling user navigation to locations within the content item. As a user utilizes the scrub bar to select a location corresponding to a content marker, a haptic notification is provided to the user indicative of a corresponding point of interest. Thereafter, the user may halt interaction with the scrub bar to being playback of the content item at the point of interest. In another embodiment, a user is enabled to provide input perpendicular to a displayed scrub bar to alternate between multiple available scrub bars and/or points of interest. For example, multiple scrub bars may be provided, each associated with a given type of point of interest.

17 Claims, 7 Drawing Sheets

(56) References Cited

U.S. PATENT DOCUMENTS

| | | | |
|---|---|---|---|
| 2010/0169786 A1* | 7/2010 | O'Brien | G06F 17/30817 715/738 |
| 2010/0262911 A1* | 10/2010 | Kaplan | G11B 27/034 715/719 |
| 2010/0287475 A1* | 11/2010 | van Zwol | G06F 3/04817 715/723 |
| 2012/0144330 A1* | 6/2012 | Flint | G06F 3/04847 715/765 |
| 2012/0223884 A1 | 9/2012 | Bi | |
| 2013/0215079 A1* | 8/2013 | Johnson | G06F 3/016 345/174 |
| 2013/0222435 A1 | 8/2013 | Choi | |
| 2014/0002346 A1* | 1/2014 | Weddle | G06F 3/016 345/156 |
| 2014/0075310 A1 | 3/2014 | Li | |
| 2014/0075317 A1 | 3/2014 | Dugan | |
| 2014/0168124 A1* | 6/2014 | Park | G06F 3/016 345/173 |
| 2014/0229884 A1 | 8/2014 | Shimazaki | |
| 2014/0292668 A1* | 10/2014 | Fricklas | G06F 3/041 345/173 |
| 2014/0340316 A1 | 11/2014 | Gu | |
| 2015/0070150 A1* | 3/2015 | Levesque | G06F 3/016 340/407.1 |
| 2015/0193196 A1* | 7/2015 | Lin | G06F 3/165 715/716 |

* cited by examiner

USER INTERACTION WITH CONTENT MARKERS

BACKGROUND

Providers of media content may generally make such media content available for users on a variety of playback devices, such as personal computers, set-top boxes, game consoles, tablets or mobile phones. In order to facilitate selective playback of portions of a media content item, a user interface may be provided enabling users to select a specific point of a content item at which to begin playback. In linear media content, such as audio and video content, a navigation bar (which may be commonly referred to as a "scrub bar") may be provided to users. Generally, each location within a scrub bar corresponds to a location within the linear media content, such that user placement of an indicator at a location of the scrub bar enables playback of the corresponding location within the linear media content. In some instances, a scrub bar may also serve as a playback indicator, enabling users to view a current playback position of the media content.

The accuracy of user input utilizing a scrub bar may be affected based on the type of interface used, the length of a content item and the size of the scrub bar provided. For example, when utilizing touch-based input, it may be very difficult to select a second-specific location within a multi-hour content (e.g., due to the accuracy afforded by touch input). This difficulty may be compounded when the scrub bar is displayed on a relatively small interface (e.g., an interface of a mobile device), since the relative size of each location of the scrub bar is reduced within such an interface.

BRIEF DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

Figure 1:
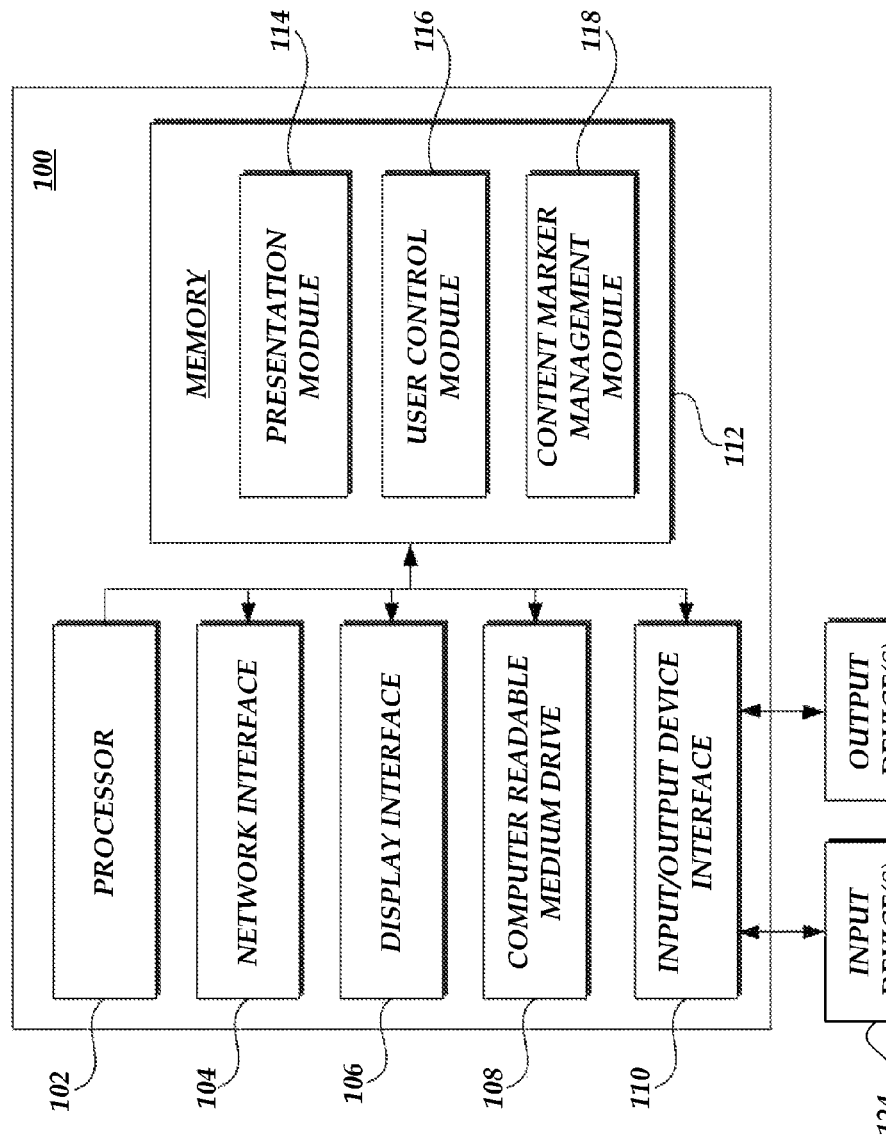
FIG. 1 is a block diagram depicting an illustrative embodiment of a computing device configured to enable navigation to content markers within a linear content.

Generally described, aspects of the present disclosure relate to enabling user interaction with content markers of linear content, such as textual, audio or video content. Specifically, a scrub bar or other navigation interface is provided that enables user selection of locations within an item of linear content for playback. In one embodiment, haptic feedback is provided during interaction with a scrub bar to indicate the presence of a content marker. Content markers can generally indicate the presence of a point of interest within the content, such as footnotes, official or unofficial commentary, user annotations, highlights, bookmarks or locations associated with a chapter, section, stanza, movement or scene. Generally, these points of interest may represent a relatively small portion of a content item. For example, a chapter may begin on at a specific second-marker within a multi-hour audio book. Further, inputs provided to a user (e.g., touch inputs) may have a relatively low accuracy. Accordingly, unaided user selection of a specific content marker may be very difficult. In accordance with aspects of the present disclosure, locations of a scrub bar corresponding to a point of interest may be indicated by content markers within the scrub bar. During user interaction with the scrub bar (e.g., as output via a display of a playback device), a user's location relative to content markers within the scrub bar may be monitored. When a user draws near to or passes over a content marker, haptic feedback (e.g., a vibrational pattern) is provided to the user, notifying the user of the point of interest corresponding to the content marker. Should a user cease utilization of the scrub bar, playback of the content can then begin or resume from the point of interest. Accordingly, users are enabled to locate points of interest within a content item intuitively and with great accuracy.

In some embodiments, multiple types of points of interest may be available to a user. Further, the amount and variety of such points of interest may make simultaneous display of content markers for all types of points of interest undesirable or unfeasible. Accordingly, embodiments of the present disclosure enable a user to selectively display one or more content marker types of a variety of available content marker types (e.g., each corresponding to a given point of interest type) based on perpendicular input. Perpendicular input may include either or both of input along a planar output displaying a scrub bar (e.g., vertical input when the scrub bar is horizontally oriented) or input outside of a planar output displaying the scrub bar (e.g., non-touch input in a "z axis" perpendicular to a display screen). For example, a user presented, via a touch screen interface, with a horizontally oriented scrub bar including chapter markers (either visible or invisible to the user) may be enabled to drag a finger vertically to select scrub bars including alternative content marker types (e.g., bookmarks, commentary, etc.). A user may further be enabled to move a finger "into" or "out of" a touch screen (e.g., by modifying a force used to press the surface of a touch screen, or by moving a finger in a direction perpendicular to a plane of the screen) to select scrub bars associated with a given content marker type. In this manner, a user is enabled to quickly and accurately locate a desired content marker from a large number or variety of content markers available.

The approaches described herein may provide significant advantages over alternatively contemplated solutions. For example, haptic feedback during use of a scrub bar may enable greater accuracy of user input than alternative feedback types. Illustratively, while visual indicators may be provided for content markers within a scrub bar, there may be a negative correlation between visibility and accuracy of such indicators. Specifically, because each location within a scrub bar is associated with a given location within a content item, a large indicator of a content marker may span multiple locations within a content item, making selection of individual locations difficult. Conversely, an accurate visual content marker (e.g., corresponding to only the intended location) may be very small or invisible to a user, especially when the resolution or size of a provided scrub bar is small (e.g., on mobile devices). Furthermore, where touch input is utilized to select content markers, visual content markers may be partially or wholly occluded by a user's hands or fingers, making selection of an individual content marker difficult and non-intuitive.

In contrast, haptic feedback may be provided with high accuracy during user interaction with a scrub bar. Such feedback will generally be un-occluded by use of a touch input. Moreover, the accuracy of haptic feedback may be adjusted during use of a scrub bar to enable accurate selection of a content marker. In one embodiment, haptic feedback is provided within an area surrounding a content marker proportional to a user's scrubbing speed or velocity. For example, a user scrubbing quickly over a set of locations may be provided with haptic feedback over a relatively large or inaccurate portion of the scrub bar. However, if the user continues to scrub over the area associated with the initial haptic feedback at progressively slower rates, the haptic feedback may be confined to progressively smaller areas, enabling accurate selection of the content marker.

As will be described below, various embodiments may be used exclusive to or in combination with the illustrative example described above. For example, in one embodiment, the personal music player may provide haptic feedback for content markers within a scrub bar, while not enabling selection of alternative content markers (e.g., via perpendicular input). In another embodiment, a user may be enabled to select alternative content makers via perpendicular input exclusive of haptic feedback for such content markers. In still another embodiment, a user may be enabled to selectively enable or disable either or both haptic feedback for content markers and selection of content marker types based on perpendicular input.

Further, in instances where haptic feedback for content markers is provided, a user may be enabled to select a type of feedback provided for a given content marker type. Illustratively, a user may be enabled to associate a specific content marker type with a specific haptic feedback pattern (e.g., a type or intensity of vibration of a playback device). Accordingly, during interaction with a scrub bar, a user can be notified of content markers of a given type based on the haptic feedback provided when arriving at or passing over the content marker. Users may therefore quickly and intuitively locate content markers of a desired type.

After selection of a content marker within a scrub bar of a playback device, the playback device can resume and/or initiate playback of the linear content item from a point of interest corresponding to the content marker. For example, user selection of a chapter content marker may cause playback of a content item from the beginning of the chapter corresponding to the content marker. In instances where content markers correspond to supplemental content, such as footnotes or comments, selection of a content marker by a user may cause immediate playback of the supplemental content. For example, in the instance of textual content items, selection of a content marker may display a footnote or comment associated with the content marker (e.g., exclusively or in conjunction with the primary text of the content). In other instances, selection of a content marker for a supplemental content may cause playback of a content item at a location of a primary content (e.g., a main body of text, a main audio recording, etc.) referencing or associated with to the supplemental content. In such instances, a user may be enabled to further select the supplemental content for playback. Examples of systems and methods enabling user selection of supplemental content, and playback of supplemental content, are provided within U.S. Patent Application Publication No. 2013/0159853, entitled "MANAGING PLAYBACK OF SUPPLEMENTAL CONTENT," which is hereby incorporated by reference in its entirety.

In some embodiments, an item of linear content or content markers corresponding to the item of linear content may be stored within data storage of a playback device. In other embodiments, content items and/or content markers may be stored remote from the playback device, such as on a remote server. Illustratively, the playback device may be configured to retrieve content items and/or content markers from the remote server. In some embodiments, content markers associated with an item of linear content may be retrieved at substantially the same time as the item of content. In other embodiments, a playback device may be configured to retrieve content markers periodically. For example, a playback device may query a remote server associated with content every n hours in order to determine whether new content markers are available. In further embodiments, a playback device may query a remote server for content markers associated with a currently played item of content. In still other embodiments, a remote server may be configured to notify a playback device of available content markers for a content item.

Although the present description may, at various locations, refer to specific examples of playback devices, such as personal audio players, embodiments of the present application may be utilized by any variety of computing device capable of presenting linear content to a user. Such computing devices include, but are not limited to, laptops, personal computers, tablet computers, personal digital assistants (PDAs), hybrid PDA/mobile phones, mobile phones, electronic book readers, digital media players, integrated components for inclusion in computing devices, appliances, electronic devices for inclusion in vehicles or machinery, gaming devices, set top boxes, electronic devices for inclusion in televisions, and the like. These computing devices may be associated with any of a number of visual, tactile, or auditory output devices, and may be associated with a number of devices for user input, including, but not limited to, keyboards, mice, trackballs, trackpads, joysticks, input tablets, trackpoints, touch screens, remote controls, game controllers, motion detectors and the like. In some embodiments, multiple devices may be utilized in conjunction to facilitate playback of a linear content item. For example, a first device (e.g., a smartphone) may represent an input enabling user control of playback on a second device (e.g., a television). Accordingly, reference to a playback device within the present disclosure may include multiple computing devices working in conjunction to facilitate playback of a linear content item.

Linear content can refer to any content containing linear media that can be directly or indirectly accessed by a user, including, but not limited to, multi-media data, digital video, audio data, electronic books ("eBooks"), electronic documents, electronic publications, computer-executable code, portions of the above and the like. References to textual content or other visually displayed content should be understood to include any form of visual or tactile content, including text, images, charts, graphs, slides, maps, Braille, embossed images, or any other content capable of being displayed in a visual or tactile medium. Content may be stored on a computing device, may be generated by the computing device or may be streamed across, or downloaded via, a network for display or output on the computing device. Moreover, content may be obtained from any of a number of sources, including a network content provider, a local data store, computer-readable media, a content generation algorithm (e.g., a text-to-speech algorithm) running remotely or locally, or through user input (e.g., text entered by a user). Content may be obtained, stored or delivered from any one or combination of sources as described above.

The foregoing aspects and many of the attendant advantages will become more readily appreciated as the same become better understood by reference to the following description of one illustrative embodiment, when taken in conjunction with the accompanying drawings depicting the illustrative embodiment.

FIG. 1 is a block diagram illustrating an embodiment of a computing device 100 configured to enable user navigation of content markers in accordance with the present disclosure. The computing device 100 may have one or more hardware processors 102 in communication with a network interface 104, a display interface 106, a computer-readable medium drive 108 and an input/output device interface 110, all of which communicate with one another by way of a communication bus. The network interface 104 may provide connectivity to one or more networks or computing systems. The processor(s) 102 may thus receive information and instructions from other computing systems or services via a network. The processor(s) 102 may also communicate to and from memory 112 and further provide output information or receive input information via the display interface 106 and/or the input/output device interface 110. The input/output device interface 110 may accept input from one or more input devices 124, including, but not limited to, keyboards, mice, trackballs, trackpads, joysticks, input tablets, trackpoints, touch screens, remote controls, game controllers, heart rate monitors, velocity sensors, voltage or current sensors, motion detectors, transponders, global positioning systems, radio frequency identification tags, or any other input device capable of obtaining a position or magnitude value from a user. The input/output interface may also provide output via one or more output devices 122, including, but not limited to, one or more speakers or any of a variety of digital or analog audio capable output ports, including, but not limited to, headphone jacks, ¼ inch jacks, XLR jacks, stereo jacks, Bluetooth links, RCA jacks, optical ports or USB ports. The display interface 106 may be associated with any number of visual or tactile interfaces incorporating any of a number of active or passive display technologies (e.g., electronic-ink, LCD, LED or OLED, CRT, projection, holographic imagery, three dimensional imaging systems, etc.) or technologies for the display of Braille or other tactile information.

Memory 112 may include computer program instructions (in some cases, grouped into modules) that the processor(s) 102 executes in order to implement one or more embodiments. The memory 112 generally includes RAM, ROM and/or other persistent or non-transitory computer-readable storage media. Memory 112 stores a presentation module 114 for managing the output of information to a display and/or other output device(s) 122 via the display interface 106 and/or input/output interface 110. Illustratively, the presentation module 114 may manage output of linear content, as well as user interface elements enabling a user to modify playback of the content. In one embodiment, the presentation module 114 manages display of a scrub bar for scrubbing through locations of a content, as well as output of haptic feedback (e.g., vibration patterns) in response to user interaction with the scrub bar. The memory 112 further includes a user control module 116 for managing and obtaining user input information received for one or more input devices 124 via the input/output device interface 110. Illustratively, user control module 116 enables a user, via input devices 124, to interact with the scrub bar, and select corresponding locations for playback of content. In one embodiment, user control module 116 further enables a user to provide input perpendicular to a scrub bar to modify display of content marker types. Memory 112 may further store a content marker management module 118. In one embodiment, the content marker management module 118 detects the presence of points of interest within a content item, manages generation of content markers corresponding to the points of interest and enables interactions with such content markers via the scrub bar. Illustratively, the content marker management module 118 may detect (e.g., via the user control module 116) user input near a position of a content marker of a scrub bar, and instruct the presentation module 114 to output haptic feedback notifying the user of the availability of a corresponding point of interest. As a further example, the content marker management module 118 may detect (e.g., via the user control module 116) user input perpendicular to a scrub bar, and enable user selection of various available scrub bars (e.g., each associated with a content marker of a different type).

While FIG. 1 is illustratively depicted as a single device, embodiments of the present disclosure may utilize multiple computing devices to facilitate navigation of content markers. Illustratively, a user may be enabled to utilize a first device, such as a tablet or smartphone, as an input to a second device, such as a television, set top box, game console or audio player. In such embodiments, the components of FIG. 1 may be duplicated in both devices or shared among devices. For example, the user control module 116 and content marker management module 118 may be included within a memory 112 of the first computing device 100 (e.g., a control device), while the presentation module 114 may be included within a memory 112 of a second computing device 100 (e.g., a presentation device). Accordingly, embodiments of the present disclosure may be implemented by any number of computing devices 100 operating in conjunction.

Figure 2:
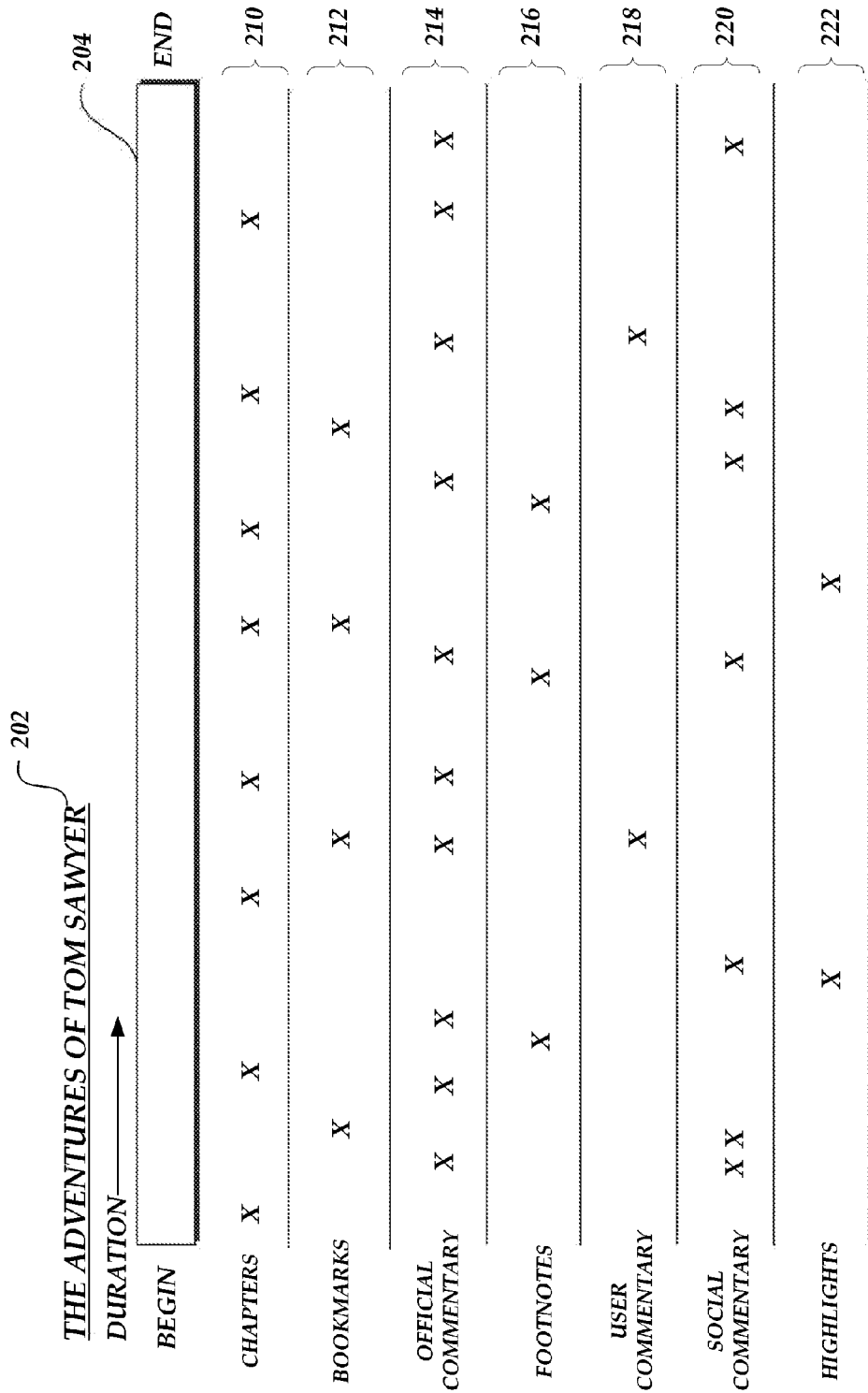
FIG. 2 is an illustrative graphical representation or visualization of audio content including content markers.

FIG. 2 is an illustrative graphical representation or visualization of a linear content item including points of interest. As shown in FIG. 2, the linear content item corresponds to the audio book "*The Adventures of Tom Sawyer*" 202. A content map 204 represents a visual map of the content item, such that the duration of the content item is displayed from left to right. As also shown in FIG. 2, the content item is associated with a number of points of interest of a variety of types, represented by content markers of portions 210-222. Specifically, each portion 210-222 reflects an association between a point of interest of a given type and a location within the content item. For example, portion 210 reflects content markers within the content item corresponding to chapter marks, while portion 212 reflects content markers corresponding to bookmarks. Similarly, portions 214-222 reflect content markers for official commentary, footnotes, user commentary (e.g., comments of a user consuming the content item), social commentary (e.g., comments of other users socially connected to the user consuming the content item), and highlights, respectively. Each content marker is associated with a location of the content item, as shown by the relative locations of the content markers and the content map 204. For example, the first chapter content marker within portion 210 corresponds to a relatively early location with the content map 204 (illustratively, at a location of 5 minutes and 32 seconds into the content item), while successive chapter content markers correspond to relatively later locations within the content map 204. While each content marker is depicted in FIG. 2 as occurring at a single location, some content markers may correspond to multiple locations, or a range of locations within a content item. For example, where a comment applies to a duration of content (e.g., multiple seconds, paragraphs, video frames, etc.) of content, a content marker indicating such commentary may be associated with the same duration of content.

Figure 3A:
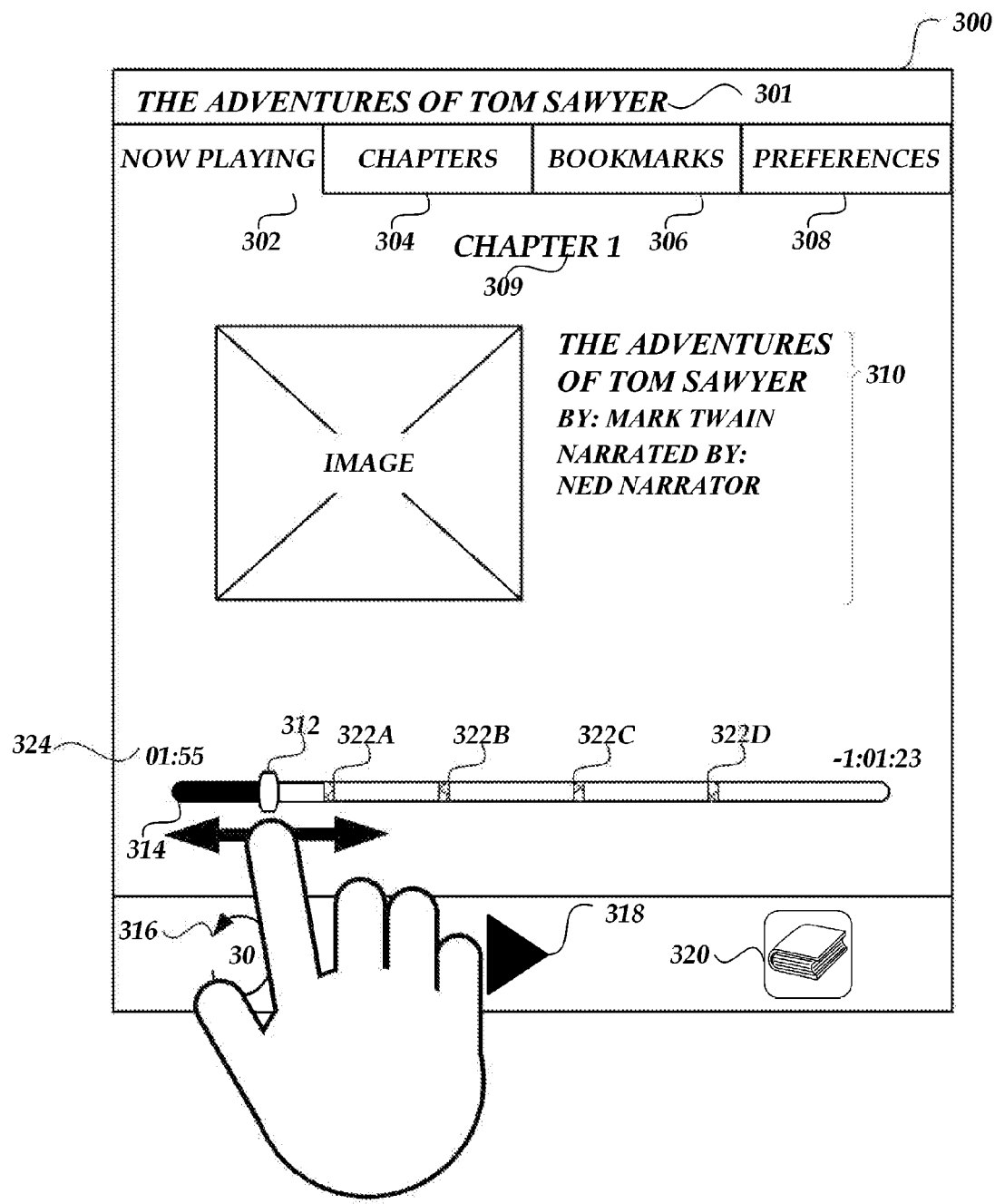
FIGS. 3A-3C depict illustrative user interfaces that may be used to navigate to content markers within a linear content.

As can be seen in FIG. 2, a given item of content may be associated with a wide variety of content markers of various types. Accordingly, selection of an individual content marker of a given type during typical user input (e.g., by use of a scrub bar) may be difficult and frustrating for users. Embodiments of the present disclosure therefore enable a user to receive haptic feedback, including motion or vibrational feedback, indicating proximity or selection of a point of interest during interaction with a user interface. One example of such a user interface is depicted within FIG. 3A. The user interface 300 of FIG. 3A is displayed by a computing device, such as computing device 100 of FIG. 1, and enables playback of a linear content item as well as haptic notifications regarding content markers of the linear content. In the examples of FIG. 3A, the linear content item corresponds to the audio content "*The Adventures of Tom Sawyer*" discussed above with respect to FIG. 2, as reflected in title 301. In order to facilitate interaction and playback of the audio content, the user interface 300 contains a number of input controls 302-308, each of which may be selected by a user to display a different aspect of the user interface 300. As illustrated in FIG. 3A, the input control 302, corresponding to "Now Playing" is currently selected. Further input controls 316-320 allow various inputs by the user, such as rewinding playback for a period of time with input control 316, starting and stopping playback with input control 318 (the display of which may alter between play and pause symbols depending on the playback state), and bookmarking a current position with input control 320. The interface 300 also includes content information 312, such as a graphic associated with the content item, title, author, and narrator information, and a chapter indicator 309 that displays the current chapter of the audio content that is ready for playback.

The interface 300 further includes a scrub bar 314 that indicates the content of the current chapter selected, as well as a progress indicator 312, which indicates the position of playback within the currently selected chapter. Illustratively, a user may utilize an input of the computing device 100, such as a touch screen interface, to select the progress indicator 312. Further, by moving the indicator 312 along the scrub bar 314 (e.g., via a touch screen), the user may select a specific location within the current chapter for playback. In one embodiment, during user movement of the indicator 312, a currently selected position may be indicated (e.g., via time stamp indicator 324).

In addition, the scrub bar 314 may be associated with multiple content markers 322 indicative of points of interest within the content item. For example, each of the content markers 322 may correspond to a user comment made within the currently selected chapter of the content item. As shown in FIG. 3A, each content marker 322 is associated with a specific location or range of locations within the content item. While depicted visually in FIG. 3A, in some instances, content markers 322 may be omitted from the user interface 300 (e.g., in order to reduce clutter within the scrub bar 314 or reduce user confusion). Further, while content markers 322 are depicted with significant width within the user interface 300, each content markers 322 may be associated with a relatively small duration of content (e.g., 1 second) corresponding to a minimal or negligible width within the scrub bar 314. In such instances, visual display of content markers 322 may be inaccurate, as the resolution and/or size of the user interface may not enable accurate display of the content marker 322 within the scrub bar 314.

Accordingly, in order to enable accurate user selection of content markers 322, the user interface 300 may interact with haptic outputs of the computing device 100 to provide haptic notifications of content markers. Specifically, as a user moves the indicator 312 along the scrubbing bar, and the indicator 312 intersects with a content marker, the computing device 100 may output a haptic notification to the user. For example, the computing device 100 may vibrate slightly, to indicate that a current position of the indicator 312 corresponds to a point of interest. In one embodiment, the vibration pattern or other haptic output utilized by the computing device 100 may be determined based on the type of content marker with which the indicator 312 has intersected. For example, if content marker 322A corresponds to user commentary, a first vibrational pattern may be output by the computing device 110. In the instance that content marker 322A corresponds to a different content marker type (e.g., indicative of official commentary), a second vibrational pattern may be output by the computing device 110. Accordingly, a user is enabled to determine, based on the haptic output, which type of content marker has been reached by the indicator 312.

In some instances, haptic output may occur when the indicator 312 passes over a content marker (e.g., when the indicator 312 shares a position within the scrub bar 314 with the content marker). In other instances, haptic output may occur when the indicator falls within a threshold distance of a content marker (e.g., within X duration of the content item, within X units of distance along the scrub bar 314, etc.). Illustratively, thresholds for output of haptic notifications may be desirable in order to alert a user that they are approaching a content marker. Thresholds for output of haptic notifications may further compensate for any lag or delay between receiving an input and providing haptic output. In one embodiment, thresholds for output of haptic notifications are absolute. In another embodiment, thresholds for output of haptic notifications are relative to the user's input. For example, thresholds may be increased when a user provides rapid input (e.g., rapid movement of the indicator 312 along the scrub bar 314) and decreased when a user provides non-rapid input. Relative thresholds may be beneficial, for example, in order for a user to quickly locate a content marker (e.g., based on rapid input), and thereafter specifically locate the content marker (e.g., based on non-rapid input).

In some embodiments, haptic feedback may be independent of the characteristics of user interaction with the indicator 312. Illustratively, on intersection of the indicator 312 and a content marker 322, a specified haptic feedback may be output by a computing device, independent of a user's speed or velocity of movement of the indicator 312. In other embodiment, a duration, type or style of haptic feedback may be dependent, at least in part, on characteristics of user interaction with the indicator 312. For example, haptic feedback may be modified based on a user's input speed or velocity, such that movement of the indicator 312 at above a threshold speed results in a modified haptic feedback or no haptic feedback (e.g., to prevent unwanted haptic output during rapid interaction with the scrub bar 314).

While aspects of FIG. 3A are described with respect to touch input, haptic feedback of content markers may also be provided during a user's interaction with additional or alternative inputs. For example, a user may be provided with a control device (e.g., a game console controller, a remote control, an in-line cable controller, etc.) enabling the user to modify the position of indicator 312. Illustratively, the user may be enabled to move the indicator 312 forward by use of a "fast forward" input and backward by use of a "rewind" input. While movement of the indicator 312 may be accomplished by non-touch inputs, haptic feedback may nevertheless be provided on intersection or proximity of the indicator 312 with a content marker 322. For example, a user, utilizing a remote control, may receive haptic feedback at a point in time in which the "fast forward" function has cause an indicator 312 to intersect or draw near to a content marker.

Further, while described with reference to a specific indicator 312 output within the user interface 300, embodiments of the present application may be utilized without output of the indicator 312 to a user. For example, during a "fast forward" function, indicator 312 may generally correspond to a current position played or prepared to play within a content item, regardless of whether the indicator 312 or scrub bar 314 are displayed to the user.

Still further, while a visible scrub bar 314 is displayed within FIG. 3A, in some embodiments a user may be enabled to scrub or navigate through a linear content via alternative inputs. For example, a user interface 300 may include a navigation portion (not shown in FIG. 3A) enabling user scrubbing of content. Such a navigation portion may enable a user to utilize gestures to control playback of a linear content. For example, a user may swipe to the right within a navigation portion to scrub forward or fast forward within a content, and swipe to the left to scrub backward or rewind. In one embodiment, a navigation portion may be blank or otherwise exclude visible elements. In another embodiment, a navigation portion may include visual cues to a user as to possible interactions with the navigation portion. Accordingly, while examples may be provided herein with respect to a visible navigation bar 314, embodiments of the present disclosure may enable interaction with content markers via a number of potential interfaces.

Figure 3B:
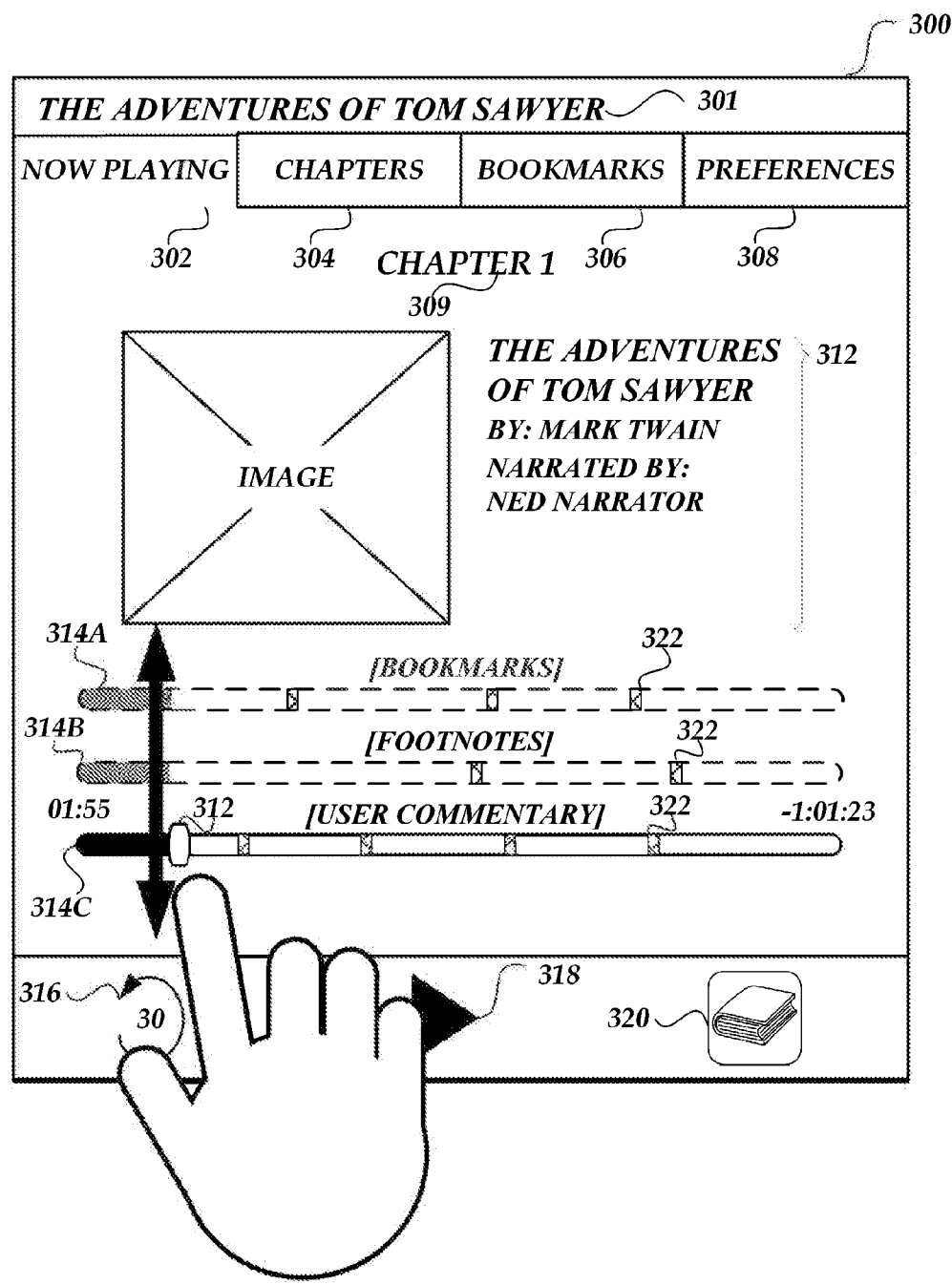

With reference for FIG. 3B, a second illustrative example of user interaction enabled by the user interface 300 will be described. Specifically, FIG. 3B depicts illustrative user interaction enabling a user to utilize the interface 300 to select from one of multiple scrub bars 314A through 314C. Because many elements of the user interface 300 are described above with respect to FIG. 3A (e.g., elements 301-312 and 316-320), these elements will not be described in detail with respect to FIG. 3B.

In FIG. 3B, the user interface 300 includes depictions of a set of alternative scrub bars 314A through 314C. Each alternative scrub bar 314 is associated with content markers of one or more types. Specifically, scrub bar 314A is associated with content markers representing bookmarks within the content item; scrub bar 314B is associated with footnotes within the content item; and scrub bar 314C is associated with user commentary within the content item. While each of the scrub bars 314 is displayed within FIG. 3B, in some instances, alternative scrub bars (e.g., scrub bars 314A and 314B) may not be visible within the interface 300. Similarly, while each scrub bar 314 is associated with content markers 322 depicted within FIG. 3B, content markers may, in some instances, not be visible to users.

Within the interface 300, a user is enabled to modify a currently viewed scrub bar 314 by motioning perpendicular to the scrub bar (e.g., either by motioning vertically within the interface 300 or motioning along a z-axis "in to" or "away from" the interface 300). For example, a user may swipe a finger down from the scrub bar 314C to enable display of the scrub bar 314B. In some instances, scrub bar 314B may be placed in the same location as scrub bar 314C, such that a user appears to be moving the scrub bars 314 within the interface.

While only three scrub bars 314 are displayed within FIG. 3B, any number of scrub bars 314 may be provided within a user interface. For example, individual scrub bars 314 may be provided for each type of content marker available, or for any combination of content marker types. In one embodiment, a user is enabled to select types of scrub bars 314 displayed within the user interface 300. In another embodiment, additional scrub bars 314, not shown within FIG. 3B, may be placed (or appear to be placed) underneath the scrub bar 314, such that a user may swipe in either direction to modify a displayed scrub bar 314. In still more embodiments, scrub bars 314 may be configured in a repeating pattern, such that a user is enabled to continually rotate between available scrub bars 314.

Accordingly, by utilizing perpendicular motion with respect to the scrub bars 314, a user is enabled to view different scrub bars 314 (or the same scrub bar 314 associated with alternative content markers). Selection of a scrub bar 314 associated with a specific content marker type may be beneficial to users in instances where a large number of content markers exist within a content item. For example, where multiple content markers exist within a content item in close proximity, selection of an individual scrub bar 314 can reduce the number of conflicting or overlapping content markers within a scrub bar 314.

As described above with respect to FIG. 3A, embodiments of the present disclosure may enable interaction with linear content via alternative inputs, such as navigation portions. Navigation portions may generally include portions of a user interface 300 with which a user may interact to scrub or navigate through content. In one embodiment, users may be enabled to modify the functionality of such a navigation portion via perpendicular input. For example, a navigation portion may initially be associated with a first set of content markers (e.g., bookmarks). Thereafter, a user may be enabled to utilize perpendicular input to alter the association of the navigation portion. For example, assume a navigation portion enables navigation of content markers types via horizontal movement. In such instance, a user may be enabled to provide vertical input to the navigation portion to modify operation of the navigation portion. Illustratively, a user may swipe vertically within the navigation portion to associate the navigation portion with specific content marker types (e.g., bookmarks, annotations, chapters, etc.). Accordingly, while examples are provided herein with respect to input perpendicular to a visible navigation bar, embodiments of the present disclosure may further enable modification of navigation portions based on perpendicular input.

Figure 3C:
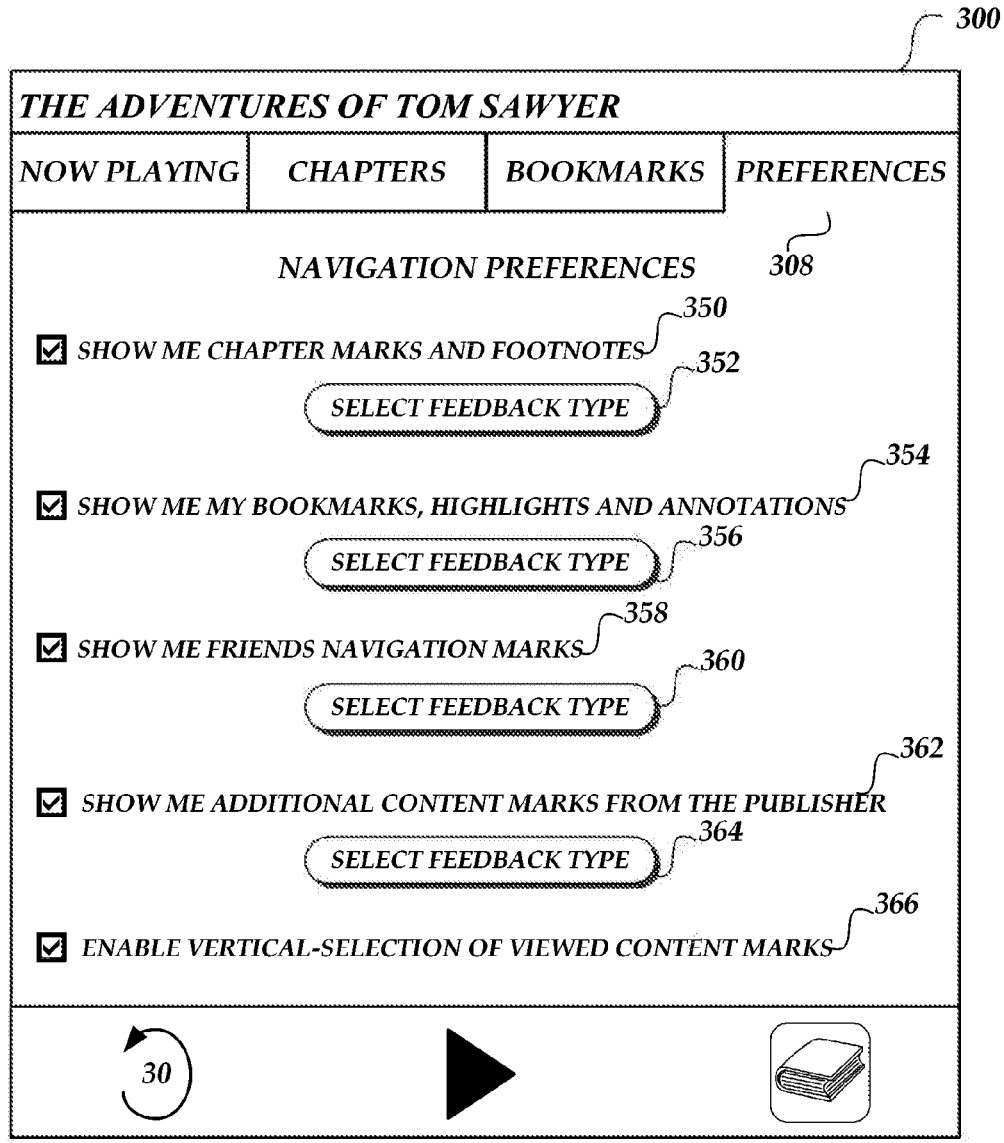

One skilled in the art will appreciate that the interactions described with respect to FIGS. 3A and 3B may be utilized exclusively or in combination. Accordingly, in one embodiment, a user is enabled to perpendicularly scroll through available scrub bars 314, independent of haptic feedback regarding content markers. In another embodiment, a user is enabled to receive haptic feedback when scrubbing past content markers, independent of selection of scrub bars 314 via perpendicular motion. In yet another embodiment, a user may be enabled to specify preferences for utilization of haptic feedback and/or vertical selection. One embodiment of the user interface 300 enabling specification of such preferences is depicted in FIG. 3C. Specifically, FIG. 3C depicts the illustrative user interface 300 after user selection of input control 308, which is configured to cause display of a portion of the user interface 300 enabling a user to specify preferences regarding interaction with content markers. In some embodiments, such user preferences may be specific to the currently depicted content (e.g., "The Adventures of Tom Sawyer"). In other embodiments, user preferences may be specified for all audio content, or for specific sets of audio content.

The illustrative user interface 300 of FIG. 3C contains user selectable input controls 350-366, which enable the user to specify various types of content markers for which haptic feedback should be provided, as well as the specific haptic feedback provided for each content marker type. For example, input control 350 enables a user to specify whether haptic feedback should be provided when scrubbing near or over chapter marks. Similarly, input controls 354, 358 and 362 enable user specification of whether haptic feedback should be provided when scrubbing near or over highlights and annotations, socially provided marks, and publisher content marks, respectively. In addition, the user interface includes controls 352, 356, 360 and 364, each of which enables a user to specify a type of haptic feedback provided for a corresponding content marker type (e.g., footnotes, highlights and annotations, socially provided marks, and publisher content marks, respectively). Illustratively, user selection of any of controls 352, 356, 360, and 364 may cause display of an dialog enabling user selection of a specific haptic feedback style (e.g., vibration or motion pattern) provided when scrubbing near or over content markers of a corresponding type. Still further, the interface 300 of FIG. 3C enables a user to enable or disable perpendicular scrolling through available scrub bars. Specifically, by selection of input control 366, the interactions of FIG. 3B may be enabled or disabled. Illustratively, a user may desire to disable perpendicular scrolling through available scrub bars in order to reduce interface complexity. Accordingly, by interaction with the user interface 300 of FIG. 3C, a user is enabled to customize the types of content markers for which haptic feedback is provided, the specific feedback provided for each content marker type, as well as selection of scrub bars corresponding to content markers of types via perpendicular scrolling.

Figure 4:
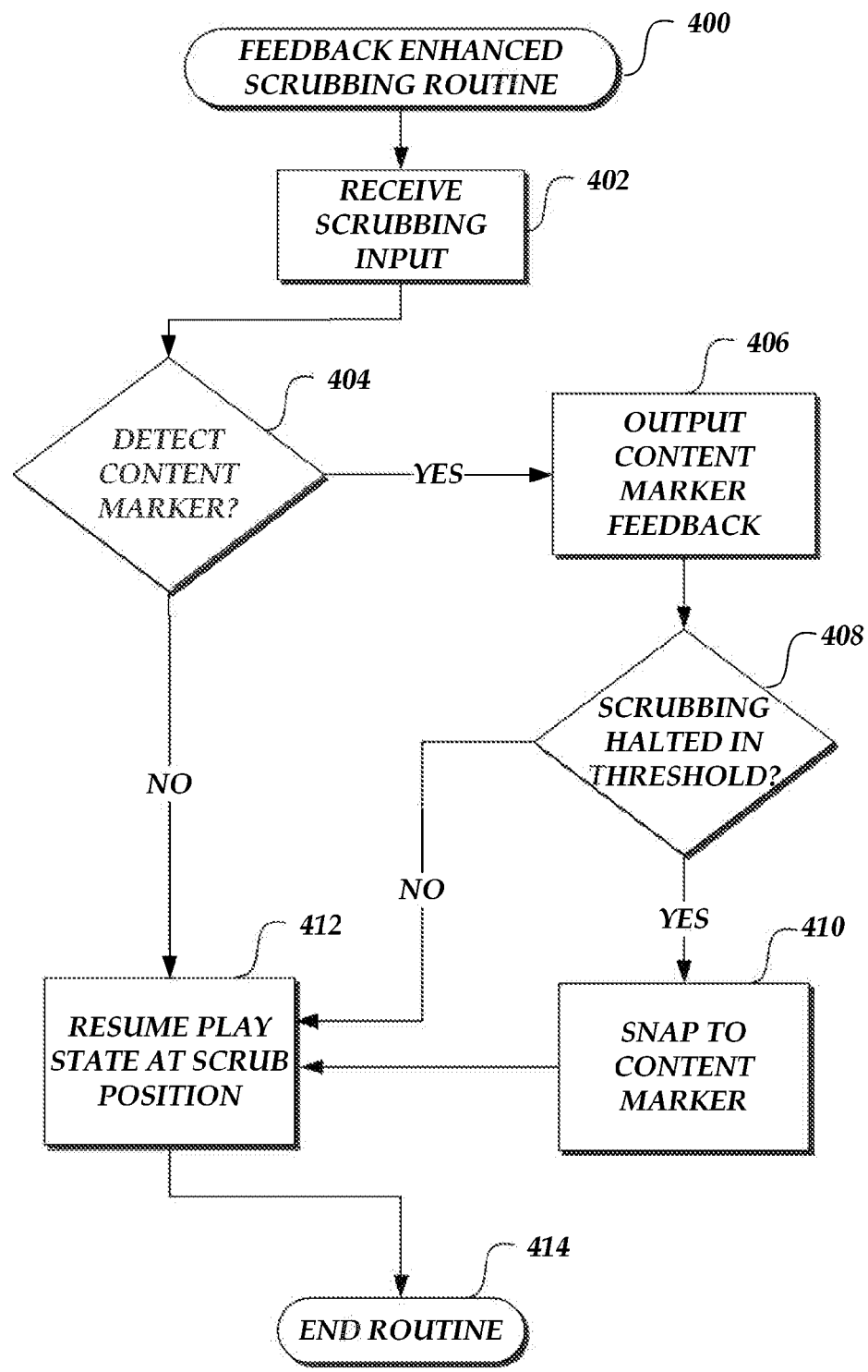
FIG. 4 is a flow diagram depicting an illustrative routine for providing content marker-based feedback during interaction with a scrub bar.

With reference to FIG. 4, one illustrative routine 400 for providing haptic feedback during user interaction with a content item is depicted. The routine 400 may illustratively be implemented by the computing device 100 of FIG. 1 (e.g., by content marker management module 118). The routine 400 begins at block 402, where the computing device 100 receives user input corresponding to movement of an indicator along a scrub bar, navigation bar or other navigation portion. In one embodiment, user input may be received via user interaction with a touch screen interface. In another embodiment, user input may be received via a controller, such as a remote control or video game interface. Illustratively, reception of user input may occur during playback of a content item or at a time in which playback of the content item is halted (e.g., prior to or after playback of a portion of the content item). At block 404, the computing device 100 determines whether the user input to the scrub bar corresponds to a location of a content marker. In one embodiment, the determination of block 404 may correspond to a determination that a user has moved an indicator (or otherwise provided input) over a location within the scrub bar corresponding to a content marker (e.g., either visible or invisible to the user). In another embodiment, the determination of block 404 may correspond to a determination that a user has moved an indicator (or otherwise provided input) within a threshold distance of a content marker. As noted above, in some embodiments, a threshold may be absolute (e.g., an absolute distance between the user's input and the content marker). In other embodiments, a threshold may be relative, e.g., to a user's speed or velocity of input. For example, a relatively large threshold may be provided after receiving user input at a high speed, while a small threshold may be provided when receiving input at a lower speed. In other embodiments, detection of a content marker at block 404 may be disabled in response to, e.g., a very high speed of user input.

At block 404, if the computing device 100 detects that a user has provided input within a threshold distance of a content marker, the routine 400 proceeds to block 406. Specifically, at block 406, a haptic output is provided from the computing device (e.g., via the output devices 122 of FIG. 1).

In one embodiment, a default style of haptic feedback (e.g., a generic vibration, vibrational pattern, motion or motion pattern) is output at block 406. In another embodiment, the user computing device 100 outputs at block 406 a user specified haptic feedback corresponding to the type of content marker detected (e.g., as specified within the user interface 300 of FIG. 3C). In one embodiment, playback of a haptic notification may be dependent or modified based on user input (e.g., as received at block 402). For example, high speed user input may result in an abbreviated or low-intensity haptic feedback pattern, while low speed input may result in a longer or higher-intensity haptic feedback pattern. In another embodiment, the output of haptic feedback at block 406 is dependent on proximity of the user input to a content marker. For example, haptic feedback may grow in intensity as a user's input approaches a content marker.

Subsequently, at block 408, the computing device 100 determines whether user interaction with a scrub bar has halted or been interrupted within a threshold distance of the content marker. In one embodiment, a low or zero threshold distance may be set within the computing device 100, such that only a halt in user input precisely corresponding to the content marker results in a positive determination at block 408. In another embodiment, a relatively large threshold may be provided, such that a halt or interruption of user input within a large distance of a content marker results in a positive determination at block 408. In still more embodiments, timing thresholds may be set within the computing device 100, such that halting of user input within a threshold amount of time after output of haptic feedback results in a positive determination at block 410. One skilled in the art will appreciate that multiple thresholds may be utilized in combination at block 408 (e.g., by requiring one or more of a set of thresholds be met, by requiring a combination of thresholds be met, etc.). Similarly to the thresholds described above, in some embodiments, thresholds utilized at block 408 may be based at least in part on a user's input (e.g., increased during rapid input).

In the illustrative routine 400, if a positive determination is made at block 408, the routine 400 continues to block 410, where a current playback position is modified to correspond to the detected content marker. Thereafter, at block 412, a playback state of the computing device 100 is resumed. Accordingly, if the computing device 100, prior to implementation of routine 400, was currently outputting the content item, the computing device 100 may continue at block 412 to output the content item, from a point corresponding to the detected content marker. Alternatively, if the computing device 100, prior to implementation of routine 400, was not currently outputting the content item, the computing device 100 may modify a current playback position of the content item without beginning playback of the content item. A user may thereafter interact with the computing device 100 (e.g., via selection of a play button) to begin playback of the content item at a position corresponding to the detected content marker.

In the alternative, if the determinations of block 404 or 408 are negative, the computing device 100 may resume a previous playback state at a point selected by the user via the received scrubbing input. Thereafter, the routine 400 ends at block 414.

Figure 5:
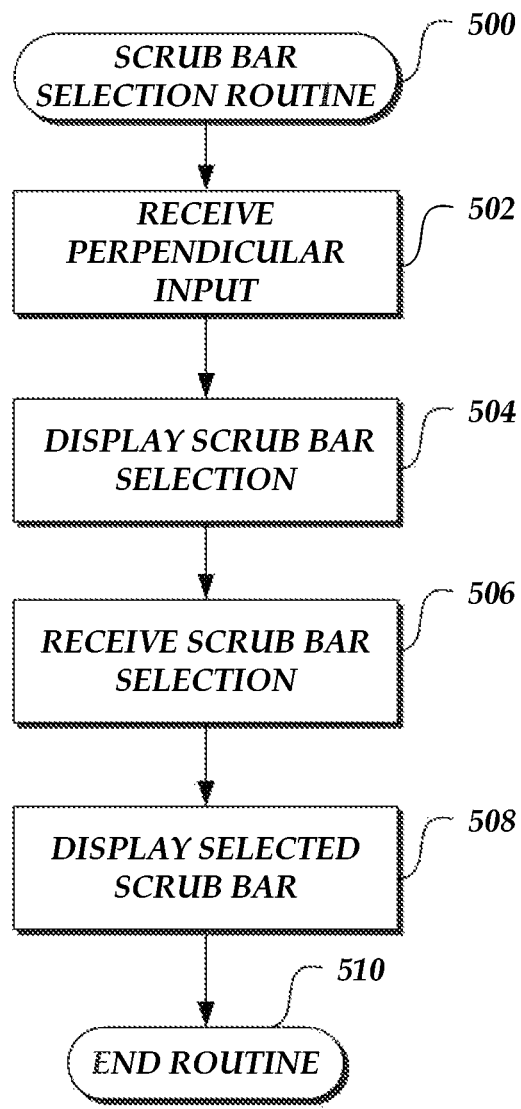
FIG. 5 is a flow diagram depicting an illustrative routine for enabling selection of content marker types within a scrub bar.

With respect to FIG. 5, an illustrative routine 500 for enabling user modification of scrub bars, navigation bars or other navigation portions is depicted. In one embodiment, the routine 500 enables user selection of different navigation portions. In another embodiment, the routine 500 enables a user to modify operation of a current navigation portion. The routine 500 may illustratively be implemented by the computing device 100 of FIG. 1 (e.g., by content marker management module 118). The routine 500 begins at block 502, where user input perpendicular to a scrub bar is received. The perpendicular input may be touch input (e.g., vertically on a touch surface) or non-touch input (e.g., by moving a finger away from a touch surface).

At block 504, the computing device displays a selection of available scrub bars and/or content marker types in response to the received input. In one embodiment, perpendicular input with respect to a scrub bar may cause display of a cylinder-style dial or vertical list, with available scrub bars at different vertical locations. Accordingly, the computing device, at block 504, may modify such a dial or list to display a selectable scrub bar. In one embodiment, the displayed scrub bar may be based at least in part on the user input. For example, a large vertical user input may display a scrub bar high in a vertical list, while a lesser vertical user input may display a scrub bar lower in the vertical list. In other embodiments, alternative scrub bars may be displayed individually, rather than simultaneously. For example, perpendicular input may result in a modification of the current scrub bar displayed on a user interface (e.g., to display a first scrub bar in place of a second scrub bar, etc.), without scrolling or other effects.

At block 506, user input corresponding to selection of a scrub bar is received. Illustratively, a user may halt or interrupt perpendicular input, in order to select a currently displayed scrub bar. The selected scrub bar is displayed by the computing device 100 at block 508. Thereafter, the user may be enabled to interact with the newly selected scrub bar, e.g., by selecting content markers associated with the new scrub bar. In this manner, a user is enabled to intuitively modify the display of content markers associated with a content item. Thereafter, the routine 500 ends at block 510.

All of the methods and processes described above may be embodied in, and fully automated via, software code modules executed by one or more general purpose computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
an output device configured to output a linear content item to a user;
a display device configured to display to the user a scrub bar enabling navigation between locations of the linear content item, wherein the scrub bar is associated with a first set of content markers, and wherein a first location on the scrub bar is selectable by a user to cause output of a portion of the linear content item from a first position within the linear content item;
an input device configured to receive user input with respect to one or more locations on the scrub bar;
a non-transitory data store including content marker information, the content marker information comprising:
the first set of content markers for the linear content item, wherein a content marker of the first set of content markers indicates that the first location on the scrub bar corresponds to a point of interest of a first type at the first position within the linear content item, and
a second set of content markers for the linear content item wherein a content marker of the second set of content markers indicates that a second location on the scrub bar corresponds to a point of interest of a second type at a second position within the linear content item; and
a processor in communication with the output device, the input device, and the non-transitory data store, the processor configured to:
receive, via the user input device, a first user input from a direction perpendicular to an orientation of the scrub bar;
disassociate the scrub bar from the first set of content markers;
associate the scrub bar with the second set of content markers;
receive, via the user input device, a second user input with respect to the first location on the scrub bar;
determine that the first location on the scrub bar is within a threshold distance of the second location on the scrub bar corresponding to the content marker of the second set of content markers; and cause output, via the output device, of haptic feedback to the user indicative of the point of interest of the second type at the second position within the linear content item.

2. The system of claim 1, wherein the linear content item comprises at least one of an audio content item, a video content item, or a textual content item.

3. The system of claim 1, wherein the point of interest of the first type at the first position within the linear content item corresponds to at least one of a footnote, official commentary, unofficial commentary, social-network commentary, a user annotation, a highlight, a bookmark, a chapter, a section, a stanza, a movement, or a scene.

4. The system of claim 1, wherein the output device and the display device correspond to a single device.

5. The system of claim 1, wherein the processor is further configured to:
  determine that further user input has not been received by the input device subsequent to output of the haptic feedback; and
  cause output, via the output device, of another portion of the linear content item from the second position in the linear content item.

6. Computer-readable non-transitory storage including computer-executable instructions that, when executed by a processor, cause the processor to at least:
  cause output, via a display, of a navigation bar enabling navigation between positions within a content item, wherein a first location on the navigation bar is selectable to cause navigation to a first position within the content item;
  receive input corresponding to the first location on the navigation bar;
  determine that the first location on the navigation bar is within a threshold distance of a second location on the navigation bar corresponding to a content marker, wherein the content marker indicates that the second location on the navigation bar corresponds to a point of interest at a second position within the content item;
  generate output of haptic feedback indicative of the point of interest corresponding to the second location on the navigation bar;
  determine that an interruption in input has occurred within a threshold time period subsequent to generation of the output of the haptic feedback, wherein the threshold time period is based at least in part on the velocity of the input prior to the interruption; and
  cause navigation to the second position within the content item.

7. The computer-readable non-transitory storage of claim 6, wherein the computer-executable instructions further cause the processor to at least determine a specific haptic feedback for output.

8. The computer-readable non-transitory storage of claim 6, wherein the specific haptic feedback is determined based at least in part on a preference specified by a user.

9. A computer-implemented method comprising:
  receiving a first user input corresponding to a first location on a navigation portion of a user interface, wherein:
    the navigation portion is associated with a first set of content markers,
    each content marker of the first set of content markers indicates that a location on the navigation portion corresponds to a point of interest of a first type within the content item, and
    each location the navigation portion indicated by a content marker of the first set of content markers is selectable to cause navigation to a position within a content item;
  identifying a content marker of the first set of content markers for a second location on the navigation portion, wherein the second location is within a threshold distance of the first location, and wherein the content marker indicates that that the second location of the navigation portion corresponds to a point of interest of the first type within the content item;
  causing output, via the user interface, of haptic feedback indicative of the point of interest of the first type indicated by the content marker of the first set of content markers;
  receiving a second user input in a direction perpendicular to an orientation the navigation portion;
  disassociating the navigation portion from the first set of content markers; and
  associating the navigation portion with a second set of content markers, wherein each content marker of the second set of content markers is associated with a point of interest within the content item of a second type.

10. The computer-implemented of method claim 9, wherein the point of interest of the first type indicated by the content marker of the first set of content markers corresponds to at least one of a footnote, official commentary, unofficial commentary, social-network commentary, a user annotation, a highlight, a bookmark, a chapter, a section, a stanza, a movement, or a scene.

11. The computer-implemented of method claim 9, wherein the navigation portion is blank.

12. The computer-implemented method of claim 9, wherein each content marker of the second set of content markers indicates that a location on the navigation portion corresponds to a point of interest of a second type within the content item.

13. The computer-implemented method of claim 12 further comprising:
  receiving a third user input corresponding to a third location on the navigation portion indicated by a content marker of the second set of content markers; and
  cause navigation to a position within the content item corresponding to the third location on the navigation portion.

14. A system comprising:
  a non-transitory data store including:
    information for a first content marker associated with a navigation portion of a user interface, the first content marker indicating that a first location on the navigation portion corresponds to a point of interest of a first type at a first position within a content item, and
    information for a second content marker, the second content marker indicating that a second location on the navigation portion corresponds to a point of interest of a second type at a second position within the content item; and
  a processor in communication with the non-transitory data store, the processor configured to at least:
    receive first user input to the navigation portion from a direction perpendicular to an orientation of the navigation portion;
    disassociate the first content marker from the navigation portion of the user interface;
    associate the second content marker with the navigation portion of the user interface;

receive a second user input with respect to the navigation portion of the user interface, the second user input indicating a selection of the first location on the navigation portion;

determine that the first location is within a threshold distance of the second location indicated by the second content marker; and cause output of haptic feedback indicative of the point of interest of the second type corresponding to the second location on the navigation bar.

15. The system of claim 14, wherein the processor is further configured to at least determine the haptic feedback based at least in part on the second type of the point of interest.

16. The system of claim 15, wherein the processor is further configured to at least determine the haptic feedback based at least in part on user specified haptic feedback for the second type of the point of interest.

17. The system of claim 14, wherein at least one of the first content marker or the second content marker is visible on the navigation portion.

* * * * *